(12) United States Patent
Kawakami et al.

(10) Patent No.: US 10,917,696 B2
(45) Date of Patent: Feb. 9, 2021

(54) CONTENT PROVISION SERVER, CONTENT PROVISION PROGRAM, CONTENT PROVISION SYSTEM AND USER PROGRAM

(71) Applicant: DWANGO Co., Ltd., Tokyo (JP)

(72) Inventors: Nobuo Kawakami, Tokyo (JP); Hiroaki Saito, Tokyo (JP); Takashi Kojima, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/652,334

(22) PCT Filed: Nov. 19, 2018

(86) PCT No.: PCT/JP2018/042725
§ 371 (c)(1),
(2) Date: Mar. 30, 2020

(87) PCT Pub. No.: WO2019/102971
PCT Pub. Date: May 31, 2019

(65) Prior Publication Data
US 2020/0296466 A1    Sep. 17, 2020

(30) Foreign Application Priority Data

Nov. 24, 2017  (JP) ................................. 2017-225811

(51) Int. Cl.
| | | |
|---|---|---|
| H04N 21/4788 | (2011.01) | |
| H04N 21/2187 | (2011.01) | |
| H04N 21/442  | (2011.01) | |
| H04N 21/488  | (2011.01) | |

(52) U.S. Cl.
CPC ..... *H04N 21/4788* (2013.01); *H04N 21/2187* (2013.01); *H04N 21/44204* (2013.01); *H04N 21/4882* (2013.01)

(58) Field of Classification Search
CPC ........... H04N 21/4788; H04N 21/2187; H04N 21/44204; H04N 21/4882
See application file for complete search history.

(56) References Cited

U.S. PATENT DOCUMENTS

2002/0042920 A1 * 4/2002 Thomas ............... H04N 21/235
                                                                725/87

OTHER PUBLICATIONS

English translation of Decision to Grant a Patent for JP Application No. 2017-225811, dated Dec. 4, 2018.
(Continued)

*Primary Examiner* — Chenea Davis
(74) *Attorney, Agent, or Firm* — Dorsey & Whitney LLP

(57) ABSTRACT

Communications are established between a referring content and a referred content. A content providing server 1 includes an obtainer 11 configured to obtain first post data P1 from a first user terminal 3 on which first content data M1 is being viewed, and second post data P2 from a second user terminal 4 on which second content data M2 is being viewed; and an output unit 12 configured to output the first content data M1 and the first post data P1 to the first user terminal 3, and the second content data M2 and the second post data P2 to the second user terminal 4, and to output, if referring to and outputting the second content data M2 on the first content data M1, the second content data M2 to the first user terminal 3, and the first post data P1 to the second user terminal 4.

14 Claims, 8 Drawing Sheets

(56) References Cited

OTHER PUBLICATIONS

English translation of Notice of Reasons for Refusal for JP Application No. 2017-225811, dated Oct. 9, 2018.
"Nico-Nico-Live Pocket Guide The First Editon Mainichi Communications, Inc.", The Nobuyuki Nakagawa, 1st edition, pp. 59-62, http://live.nicovideo.jp/s/cruise/, Nov. 15, 2010.
"What Is Niconama Cruise?", https://web.archive.org/web/20170716183422/http://live.nicovideo.jp/s/cruise, Nov. 30, 2018.

\* cited by examiner

C13b REFERENCE NOTIFICATION MESSAGE  C13a SECOND USER POST DATA
V13 SCREEN OF SECOND USER TERMINAL  C13c VIEWER-ENGAGEMENT INDEX MESSAGE

V14a DISPLAY OF FIRST USER POST
V14b DISPLAY OF SECOND USER POST
V14 SCREEN OF SECOND USER TERMINAL

V31 FIRST USER TERMINAL SCREEN

V32 SECOND USER TERMINAL SCREEN

CONTENT PROVISION SERVER, CONTENT PROVISION PROGRAM, CONTENT PROVISION SYSTEM AND USER PROGRAM

RELATED APPLICATIONS

This application is a 371 National Stage application of International Application No. PCT/JP2018/042725, filed Nov. 19, 2018, which claims priority to Japanese Patent Application No. 2017-225811, filed on Nov. 24, 2017. The aforementioned applications are incorporated herein by reference, in its entirety, for any purposes.

TECHNICAL FIELD

The present invention relates to a content providing server, a content providing program, a content providing system, and a user program that provide contents to user terminals.

BACKGROUND ART

In recent years, content providing services for streaming videos to various terminals such as personal computers, tablet terminals, portable terminals such as smartphones, television receivers, and gaming device have been widely used. Content providing services allow the viewers of videos to post comments such as thoughts on the videos as an example of reactions to the videos.

The content providing services distribute videos along with comments posted by viewers to the terminals used by the viewers. The terminals superimpose and display the comments on the distributed videos. While viewing the videos, the viewers enjoy exchanging comments with other users who have viewed the videos.

A content providing service allows live distribution of video data. A service for cyclic distributions of videos that have been distributed live is also known (see, e.g., Non-Patent Document 1). In this service, a plurality of videos are sequentially referred to for the viewers of a predetermined video. The comments input by the viewers of the referring video are also displayed on the referred videos, which allows the viewers of the referred videos to check the comments input by the viewers of the referring video.

CITATION LIST

Non-Patent Document

Non-Patent Document 1: DWANGO Co., Ltd., What's Nico Live Cruise? [online], searched on Nov. 17, 2017, Internet <URL: http://live.nicovideo.jp/s/cruise>

SUMMARY OF THE INVENTION

Technical Problem

Typical video reference services allow viewers of a referring video to merely sequentially view referred videos and fail to establish sufficient communications between a referring video and a referred video.

It is thus an object of the present invention to provide a content providing server, a content providing program, a content providing system, and a user program that allow communications between a referring content and a referred content.

Solution to the Problem

To achieve the above object, a first aspect of the present invention relates to a content distribution server. The content distribution server of the first aspect includes: an obtainer configured to obtain first post data from a first user terminal on which first content data is being viewed, and second post data from a second user terminal on which second content data is being viewed; an output unit configured to output the first content data and the first post data to the first user terminal, and the second content data and the second post data to the second user terminal, and output, if referring to and outputting the second content data on the first content data, the second content data to the first user terminal, and the first post data to the second user terminal. The output unit further outputs the second post data to the first user terminal.

The output unit may output a viewer-engagement index of the first content data to the second user terminal.

The output unit may thin the first post data and output the resulting data to the second user terminal.

The second content data may be video data. The output unit may output the first post data and the second post data with distinction on a screen of the second user terminal playing the second content data.

A second aspect of the present invention relates to a content distribution server. The content providing server of the second aspect includes: an obtainer configured to obtain first post data from a first user terminal on which first content data is being viewed, and second post data from a second user terminal on which second content data is being viewed; and an output unit configured to output the first content data and the first post data to the first user terminal, and the second content data and the second post data to the second user terminal, and output, if referring to and outputting the second content data on the first content data, the second content data to the first user terminal, and the first post data to the second user terminal. The output unit outputs attribute information of the second content data to the first user terminal before referring to the second content data on the first content data, and the first post data to the second user terminal after outputting attribute information of the first content data and before referring to the second content data.

After referring to the second content data, the output unit may perform adjustment to output, to the second user terminal, a larger amount of the first content data than before the reference.

A third aspect of the present invention relates to a content distribution server. The content distribution server of the third aspect includes: an obtainer configured to obtain first post data from a first user terminal on which first content data is being viewed, and second post data from a second user terminal on which second content data is being viewed; an output unit configured to output the first content data and the first post data to the first user terminal, and the second content data and the second post data to the second user terminal, and to output, if referring to and outputting the second content data on the first content data, the second content data to the first user terminal, and the first post data to the second user terminal. The output unit outputs, to the first user terminal, attribute information of a plurality of sets of content data as candidate reference content data that may possibly be referred to, and determines a set of content data to be referred to based on an answer from the first user terminal.

The output unit may output, to the second user terminal, a message indicating referenceability by the first content data, if the plurality of sets of candidate reference content data that may possibly be referred to include the second content data.

A fourth aspect of the present invention relates to a content providing program for causing a computer to function as the content providing server of any one of the first to third aspects.

A fifth aspect of the present invention relates to a content providing system including a first user terminal; a second user terminal; and a content providing server connected to the first user terminal and the second user terminal. In the content distribution system of the fifth aspect, the content providing server includes: an obtainer configured to obtain first post data from the first user terminal on which first content data is being viewed, and second post data from the second user terminal on which second content data is being viewed; an output unit configured to output the first content data and the first post data to the first user terminal, and the second content data and the second post data to the second user terminal, and to output, if referring to and outputting the second content data on the first content data, the second content data and the second post data to the first user terminal, and the first post data to the second user terminal. The first user terminal outputs the first content data and the first post data and outputs the second content data and the second post data if referring to the second content data on the first content data. The second user terminal outputs the second content data and the second post data, and outputs the first post data if referring to the second content data on the first content data.

A sixth aspect of the present invention relates to a content providing system including a first user terminal; a second user terminal; and a content providing server connected to the first user terminal and the second user terminal. In the content distribution system of the sixth aspect, the content providing server includes: an obtainer configured to obtain first post data from the first user terminal on which first content data is being viewed, and second post data from the second user terminal on which second content data is being viewed; an output unit configured to output the first content data and the first post data to the first user terminal, and the second content data and the second post data to the second user terminal, and output, if referring to and outputting the second content data on the first content data, the second content data to the first user terminal, and the first post data to the second user terminal. The output unit outputs attribute information of the second content data to the first user terminal before referring to the second content data on the first content data, and the first post data to the second user terminal after outputting attribute information of the first content data and before referring to the second content data. The first user terminal outputs the first content data and the first post data, and outputs the second content data if referring to the second content data on the first content data, and outputs attribute information of the second content data to the first user terminal before referring to the second content data on the first content data. The second user terminal outputs the second content data and the second post data, and outputs the first post data after outputting attribute information of the first content data to the first user terminal and before referring to the second content data.

A seventh aspect of the present invention relates to a content providing system including a first user terminal; a second user terminal; and a content providing server connected to the first user terminal and the second user terminal. In the content distribution system of the seventh aspect, the content providing server includes: an obtainer configured to obtain first post data from a first user terminal on which first content data is being viewed, and second post data from a second user terminal on which second content data is being viewed; an output unit configured to output the first content data and the first post data to the first user terminal, and the second content data and the second post data to the second user terminal, and output, if referring to and outputting the second content data on the first content data, the second content data to the first user terminal, and the first post data to the second user terminal. The output unit outputs, to the first user terminal, attribute information of a plurality of sets of content data as candidate reference content data that may possibly be referred to, and determines a set of content data to be referred to based on an answer from the first user terminal. The first user terminal outputs the first content data and the first post data, and outputs the second content data if referring to the second content data on the first content data, and outputs attribute information of the second content data before referring to the second content data on the first content data. The second user terminal outputs the second content data and the second post data, and outputs the first post data after outputting attribute information of the first content data to the first user terminal and before referring to the second content data.

An eighth aspect of the present invention relates to a user program used by a user terminal which is connected to a content providing server and on which first content data is viewed. The user program according to the eighth aspect causes a computer to function as an output unit configured to receive, from the content providing server, the first content data and first post data input by a user viewing the first content data and output the received data; and receive, from the content providing server, second content data and second post data input by a user viewing the second content data and output the received data if referring to the second content data on the first content data.

A ninth aspect of the present invention relates to a user program used by a user terminal which is connected to a content providing server and on which second content data is viewed that is to be referred to on first content data. The user program of the ninth aspect causes a computer to function as an output unit configured to receive, from the content providing server, first post data input by a user viewing the first content data, the second content data, and second post data input by a user viewing the second content data and output the received data. The content providing server outputs attribute information of the second content data to a user terminal on which the first content data is viewed before referring to the second content data on the first content data. The output unit receives and outputs the first post data from the content providing server after outputting attribute information of the first content data to the user terminal on which the first content data is viewed and before referring to the second content data.

A tenth aspect of the present invention relates to a user program used by a user terminal which is connected to a content providing server, on which first content data is viewed, and which refers to second content data on the first content data. The user program of the tenth aspect causes a computer to function as an output unit configured to receive, from the content providing server, first post data input by a user viewing the first content data, the first content data, and the second content data and output the received data. The output unit outputs attribute information of a plurality of sets of content data as candidate reference content data that may possibly be referred to, and refers to a set of content data determined based on an answer from the user terminal.

An eleventh aspect of the present invention relates to a user program used by a user terminal which is connected to a content providing server and on which second content data is viewed that is to be referred to on first content data. The user program of the eleventh aspect causes a computer to function as an output unit configured to receive, from the content providing server, first post data input by a user viewing the first content data, the second content data, and second post data input by a user viewing the second content data and to output the received data. The content providing server outputs, to a user terminal on which the first content data is viewed, attribute information of a plurality of sets of content data as candidate reference content data that may possibly be referred to, and determines a set of content data to be referred to based on an answer from the user terminal on which the first content data is viewed. The output unit outputs a message indicating referenceability by the first content data, if the plurality of sets of candidate reference content data that may possibly be referred to include the second content data.

Advantages of the Invention

The present invention provides a content providing server, a content providing program, a content providing system, and a user program that allow communications between a referring content and a referred content.

DESCRIPTION OF EMBODIMENTS

Figure 1:
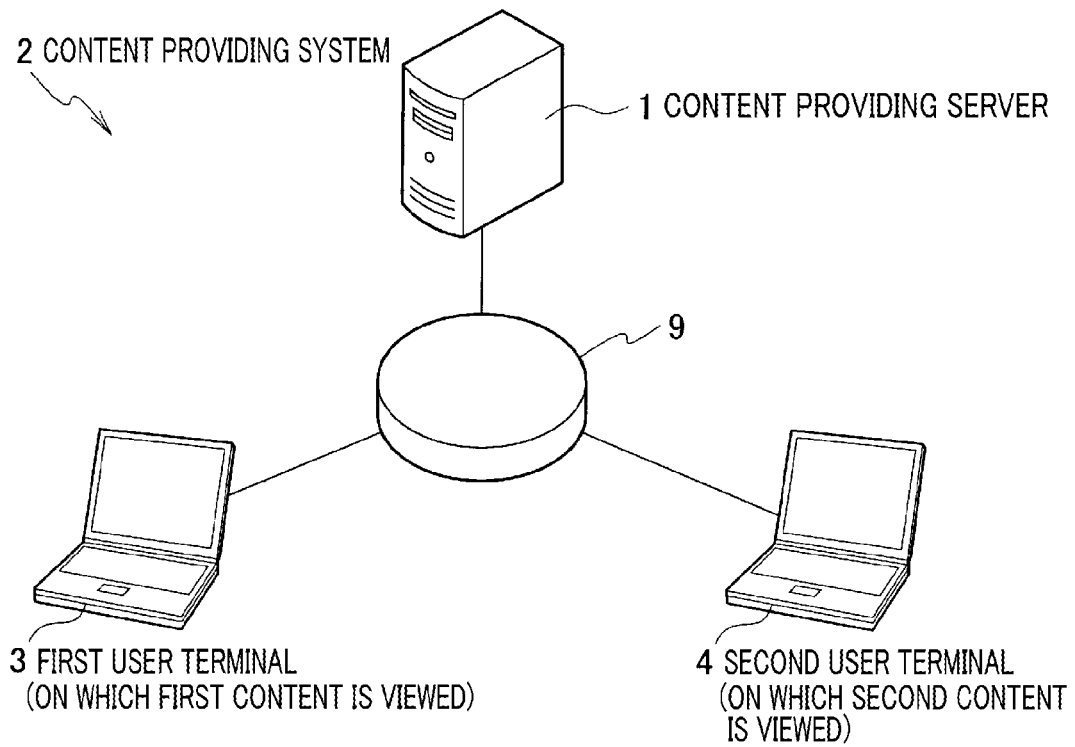
FIG. 1 illustrates a system configuration of a content providing system of an embodiment of the present invention.

Next, embodiments of the present invention will be described with reference to the drawings. In the following description of the drawings, the same or similar reference characters are used to denote the same or similar elements.

In the embodiments of the present invention, a "post" is data input by a viewer who is viewing a content such as a video and allows communications between the viewer and the other users. The "post" may also be referred to as a "comment" or a "reaction."

The word "live" meant in the embodiments of the present invention includes not only completely the same time in a strict sense but also quick processing in devices. Delays caused by transmission and processing are also acceptable.

First Embodiment

A content providing system 2 employing a content providing server 1 of a first embodiment of the present invention will be described with reference to FIG. 1. The content providing system 2 includes the content providing server 1, a first user terminal 3, and a second user terminal 4. The content providing server 1, the first user terminal 3, and the second user terminal 4 are communicably connected to each other via a communication network 9 such as the internet.

The first user terminal 3 and the second user terminal 4 are information terminals such as computers, smartphones, or tablets and used by users who view the contents provided by the content providing server 1. In the embodiments of the present invention, the contents are video data, for example.

While the example shown in FIG. 1 will be described where the content providing system 2 includes one first user terminal 3 and one second user terminal 4, the number of each terminal is not limited thereto.

Each of the first user terminal 3 and the second user terminal 4 is a typical computer including a processor, a storage, and a communication device. The typical computer executes user programs to implement predetermined functions.

The first user terminal 3 allows for a live view of first content data M1 provided from the content providing server 1. The first user terminal 3 includes an output unit that receives the first content data M1 and first post data P1 from the content providing server 1 and outputs the first content data M1 and the first post data P1. In referring to second content data M2 on the first content data M1, the first user terminal 3 receives the second content data from the content providing server 1 and outputs the received data.

The first user terminal 3 transmits post data associated with the predetermined timing of the first content data M1 to the content providing server 1, and receives the first post data P1 containing the post data of each user viewing the first content data M1. The first user terminal 3 superimposes the first post data P1 on the first content data M1 and outputs the resulting data. The first post data P1 is output in accordance with the play time of the first content data M1 and is displayed flying across the screen.

The second user terminal 4 allows for a view of the second content data M2 provided by the content providing server 1 and operates like the first user terminal 3.

In the first embodiment, in referring to the second content data M2 on the first content data M1, the first user terminal 3 outputs the second content data M2. The second user terminal 4 outputs the first post data P1 and a viewer-engagement level of the first content data M1.

Figure 2:
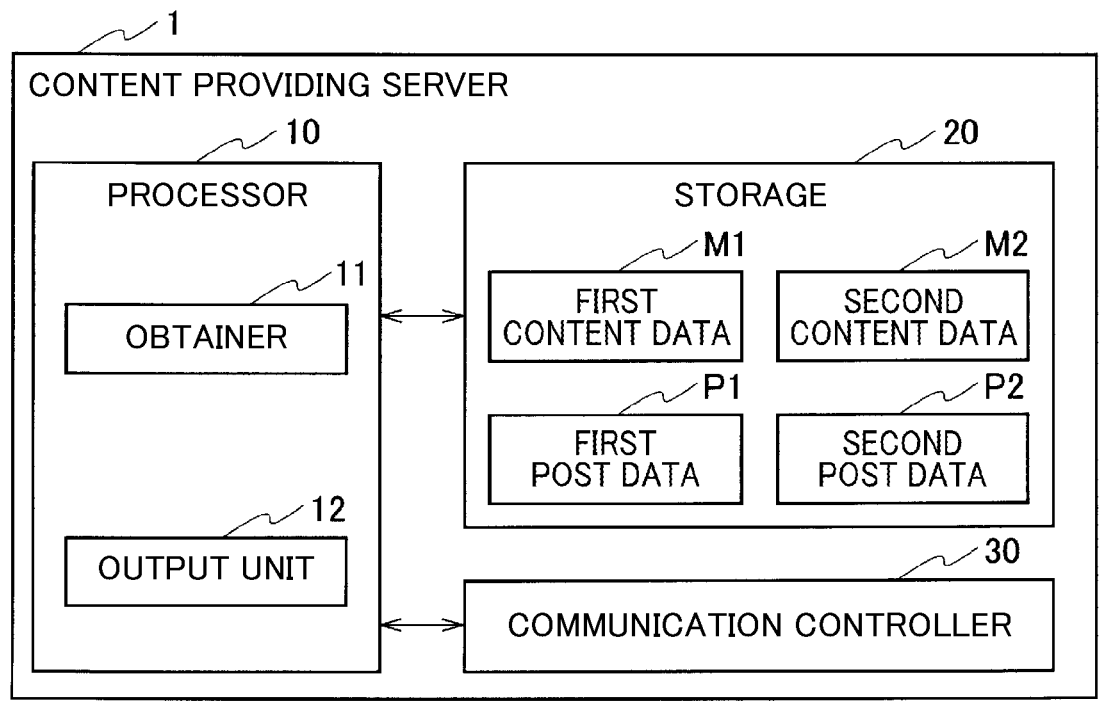
FIG. 2 illustrates a hardware configuration and functional blocks of a content providing server of the embodiment of the present invention.

The content providing server 1 provides the first user terminal 3 and the second user terminal 4 with contents including videos. As shown in FIG. 2, the content providing server 1 is a typical computer including a processor 10, a storage 20, and a communication controller 30. The typical computer executes content providing programs to implement the functions shown in FIG. 2.

The processor 10 is a central processing unit (CPU) that reads and writes the data stored in the storage 20 and inputs and outputs data to and from the communication controller 30 to execute processing in the content providing server 1. The storage 20 is a read-only memory (ROM), a random-access memory (RAM), or a hard disk, for example, that stores various types of data such as input data, output data, and intermediate data to allow the processor 10 to execute the processing. The communication controller 30 is an interface for transmitting and receiving data to and from the communication network 9.

The storage 20 stores, as well as the content providing programs; the first content data M1, the second content data M2, the first post data P1, and the second post data P2.

The first content data M1 and the second content data M2 are content data provided to the first user terminal 3 and the second user terminal 4, respectively. An example will be described in the embodiments of the present invention where the first content data M1 and the second content data M2 are video data for live broadcast that generates videos live and provides the user terminals with the videos. The content data may be however video data prepared in advance.

The first post data P1 is obtained from the first user terminal 3 on which the first content data M1 is viewed, and associated with the play time of the first content data M1. The second post data P2 is obtained from the second user terminal 4 on which the second content data M2 is viewed, and associated with the play time of the second content data M2. The first post data P1 and the second post data P2 may be text data, image data, or video data.

The processor 10 includes an obtainer 11 and an output unit 12.

The obtainer 11 obtains the first content data M1, the second content data M2, the first post data P1, and the second post data P2. The obtainer 11 obtains the first post data P1 from the first user terminal 3 on which the first content data M1 is being viewed, and the second post data P2 from the second user terminal 4 on which the second content data M2 is being viewed. The obtainer 11 stores the obtained first content data M1, second content data M2, first post data P1, and second post data P2 in the storage 20. If the first content data M1 or the second content data M2 is video data for live broadcasting, the obtainer 11 sequentially obtains the data from a camera, for example, and stores the obtained data in the storage 20.

The output unit 12 outputs the content data and the post data to the first user terminal 3 and the second user terminal 4. The output unit 12 outputs the first content data M1 and the first post data P1 to the first user terminal 3, and the second content data M2 and the second post data P2 to the second user terminal 4. The output unit 12 transmits, to the terminals of the users, predetermined content data in association with the post data input by the users viewing this content data. Other content data may be referred to on the predetermined content data.

In the embodiments of the present invention, "referring" or "reference" means playing other content data on a pre-determined content data. For example, in referring to the second content data M2 on the first content data M1 viewed on the first user terminal 3, the first user terminal 3 outputs the second content data M2. While there are some possible formats for referring to contents as shown in the following examples, the formats are not limited thereto.

(1) Method of Replacing First Content Data M1 with Second Content Data M2

In this case, the first user terminal 3 plays the second content data M2 as the first content data M1. The first content data M1 is a copy of the second content data M2.

(2) Method of Playing Both First and Second Content Data M1 and M2

For example, the first user terminal 3 plays the second content data M2 and, in a PinP (picture-in-picture) mode, the first content data M1. In reverse, the first user terminal 3 plays the first content data M1 and, in the PinP, the second content data M2. Alternatively, the display screen of the first user terminal 3 may be divided to play the first content data M1 and the second content data M2 side-by-side.

If content data is referred to, the post data input by a user viewing a referring content is distributed to the terminals of the users viewing the referred contents. Specifically, in referring to and outputting the second content data M2 on the first content data M1, the output unit 12 outputs the second content data M2 to the first user terminal 3, and outputs the first post data P1 to the second user terminal 4. For example, as shown in FIG. 3, output to a screen V11 of the second user terminal 4 are the video data (as the second content data M2) on a baseball game along with first user post data C11a, and second user post data C11b.

The viewers of the first content data M1 and the second content data M2 are different in principle. When the second content data M2 is viewed on the first content data M1, the creator (or the author) of the first content data M1 may present, on the first content data M1, his/her statement on the second content data M2 via audio or video data. This allows the users viewing the first content data M1 to input posts based on the statement of the creator of the first content data M1.

Figure 3:
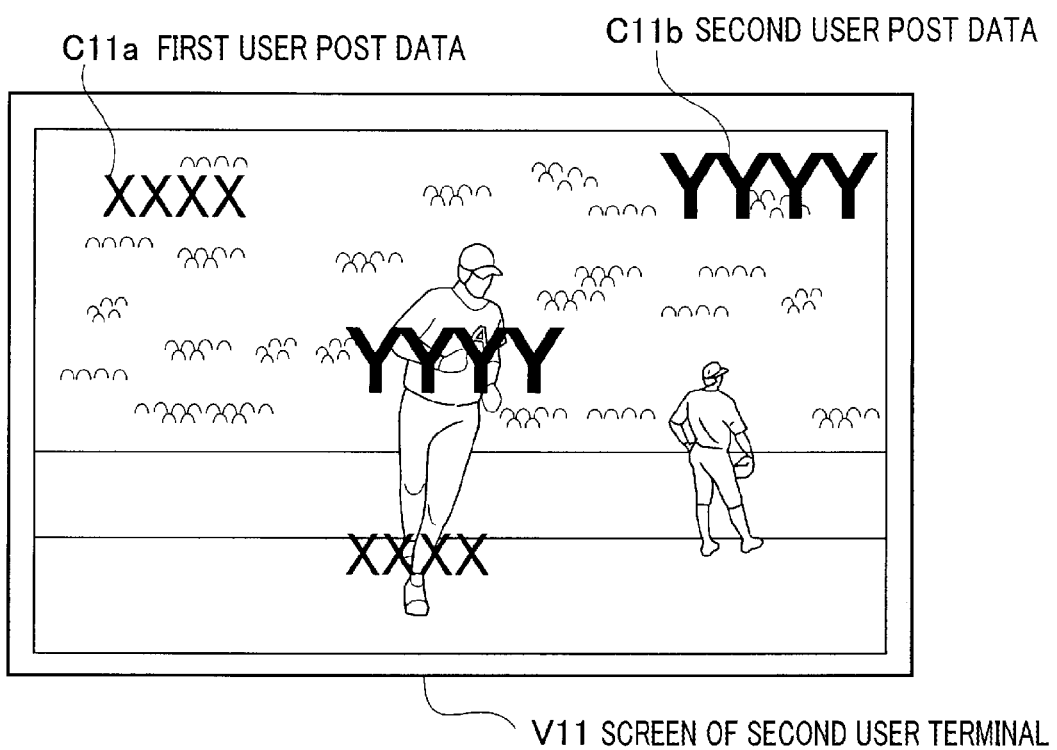
FIG. 3 illustrates an example of a screen displayed on a second user terminal in a first embodiment of the present invention.

For example, in the example shown in FIG. 3, assume that the creator of the first content data M1 prefers Team A, whereas the creator of the second content data M2 prefers Team B. The viewers of the first content data M1 may prefer Team A, whereas the viewers of the second content data M2 may prefer Team B.

Accordingly, the posts input by the users who are viewing the first content data M1 after viewing the referred second content data M2 may be of different types, such as points of view, forms, or impressions, from the posts input by the users who are viewing the second content data M2. The users who are viewing the second content data M2 refer to the posts of further users with different attributes, which allows the users to establish communications with the further users with different attributes via the contents and the post data.

Figure 4:
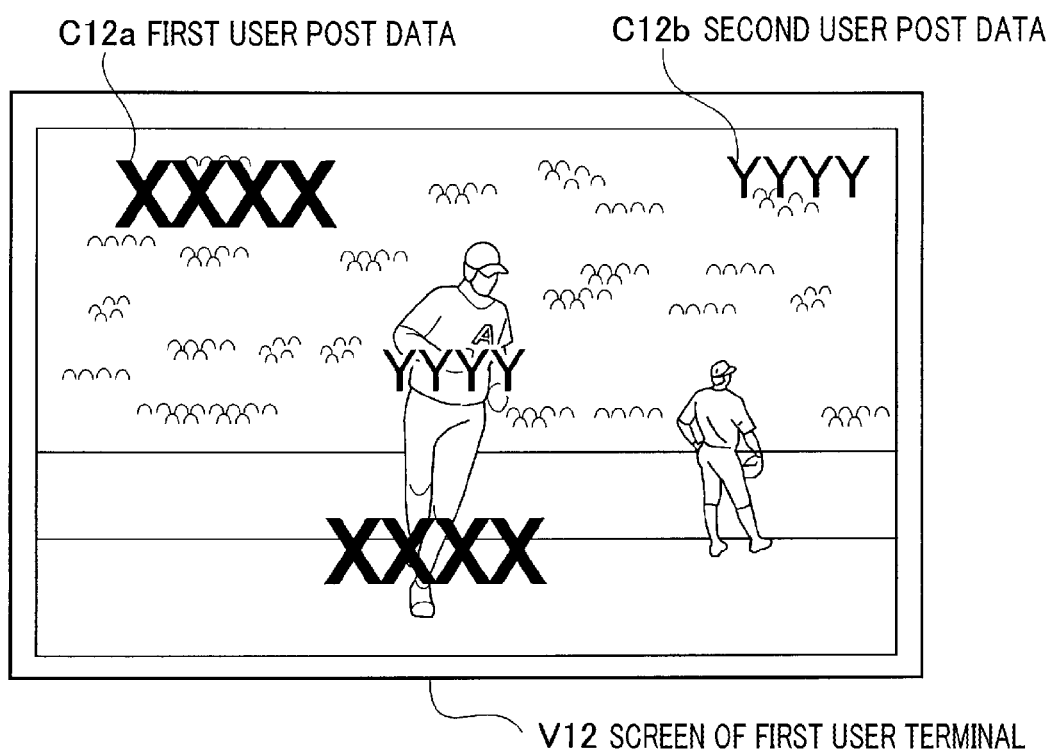
FIG. 4 illustrates an example of a screen displayed on a first user terminal in the first embodiment of the present invention.

In order to enable interactive communications, the output unit 12 may further output the second post data P2 to the first user terminal 3. Specifically, as shown in FIG. 4, output to a screen V12 of the first user terminal 3 are the video data (as the first content data M1) on the baseball game referring to the second content data M2 along with first user post data C12a, and second user post data C12b.

In this manner, both the first post data P1 and the second post data P2 are output in association with the second content data M2 and the first content data M1 referring to the second content data M2. As described above, in the first embodiment, it is possible to establish interactive communications between the viewers of the first content data M1 and the viewers of the second content data M2.

The output unit 12 may thin the first post data P1 and output the resulting data to the second user terminal 4. For example, if the second content data M2 is a program of a famous person or a famous program, sets of content data may refer to the second content data M2 to generate a plurality of spin-offs from the second content data M2. Accordingly, if the second post data P2, all the post data on the content data referring to the second content data M2 are output to the second user terminal 4, the posts overlap one another, which may lower the visibility of the contents and the posts. Therefore, the output unit 12 may pick up several posts out of the posts contained in the first post data P1 and output the posts thus picked up to the second user terminal 4. The output unit 12 may select the posts to be output to the second user terminal 4 at random or in accordance with a predetermined rule. The posts may be picked up differently from content data to content data referring to the second content data M2.

Figure 5:
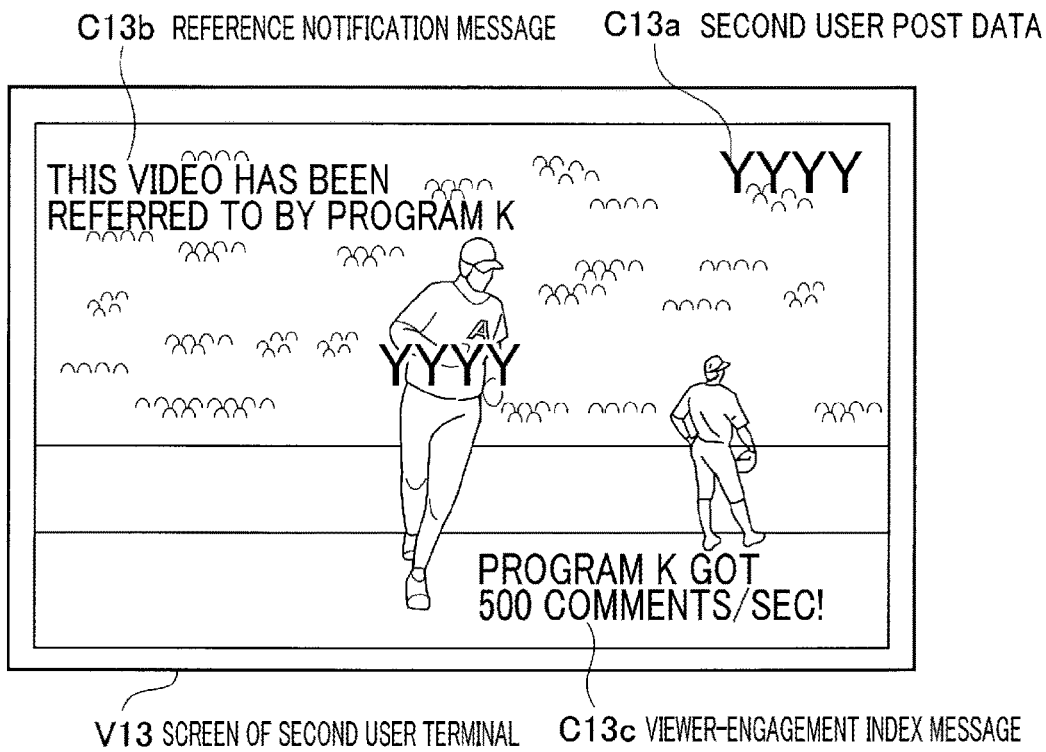
FIG. 5 illustrates an example of a screen of the second user terminal displaying a reference notification message in the first embodiment of the present invention.

The output unit 12 may output, to the second user terminal 4, a message indicating that this content has referred to by other content data. For example, as shown in FIG. 5, a screen V13 of the second user terminal outputs second user post data C13a and a reference notification message C13b. The reference notification message C13b may specify the attribute, such as the name, of the referring program (i.e., the first content data M1) like "This content has been referred to by Program K." The fact that the content has been referred to is output to the second user terminal 4, which notifies in advance the user of the second user terminal 4 that different types of posts may be referred to.

In addition, the output unit 12 may output the viewer-engagement index of the first content data M1 to the second user terminal 4. The viewer-engagement index may be the number of viewers of the first content data M1, the number of posts per unit time. For example, as shown in FIG. 5, the screen V13 of the second user terminal outputs a viewer-engagement index message C13c. The viewer-engagement index message C13c specifies the viewer-engagement index like "Program K got 500 comments/min!."

The output unit 12 outputs the viewer-engagement index of other content data at any time. For example, the output unit 12 may output the viewer-engagement index of the other content data each time when the other content data refers to the second content data M2 or may output the viewer-engagement index of the other content data at a predetermined time. In addition, the output unit 12 may output the link for viewing the other content data.

The viewer-engagement index is output to the second user terminal 4, which may motivate the user of the second user terminal 4 to view the first content data M1.

The second user terminal 4 displays the first post data P1, which allows the user of the second user terminal 4 to select, based on the post data, one of the first content data M1 and the second content data M2 matching his/her own preference. For example, referring to the first post data P1 and finding the first content data M1 more interesting than the second content data M2, the user of the second user terminal 4 may stop viewing the second content data M2 and start viewing the first content data M1. Since the second content data M2 is referred to on the first content data M1, the contents of both the data are not largely different and the user may select contents to be viewed after referring to the post data on the contents.

Since the second user terminal 4 outputs the first post data P1 and the second post data P2, the output unit 12 may output the first post data P1 and the second post data P2 with distinction on the screen of the second user terminal 4 playing the second content data M2. The first user terminal 3 may also output the first post data P1 and the second post data P2 with distinction.

Figure 6:
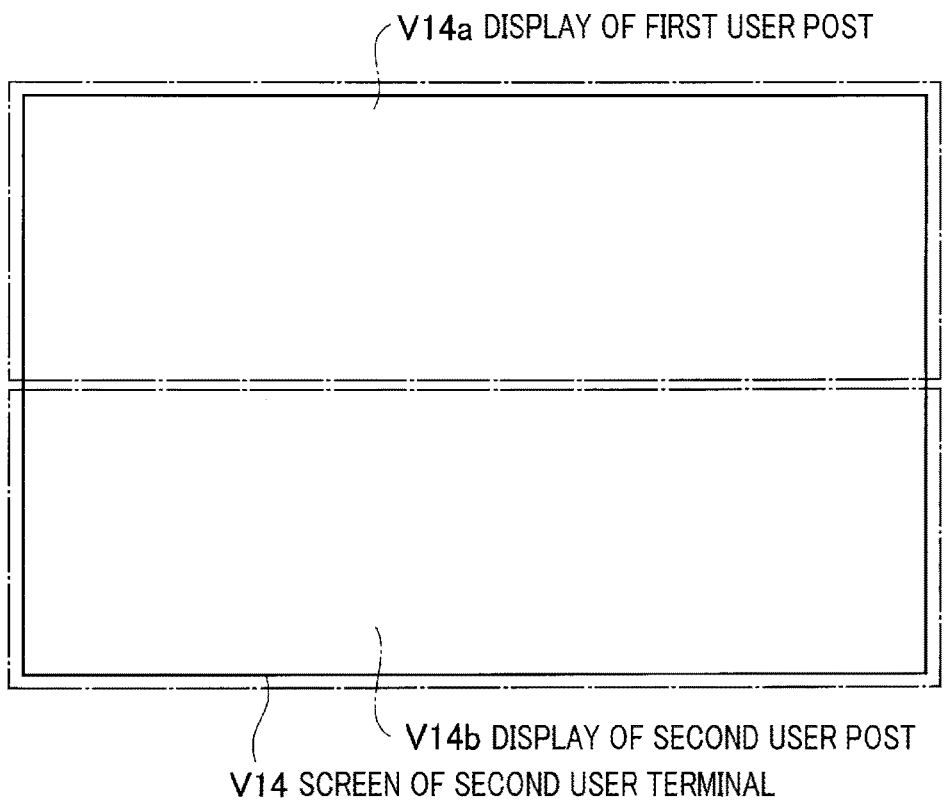
FIG. 6 illustrates an example of a screen of the second user terminal displaying a first user post and a second user post with distinction in the first embodiment of the present invention.

For example, output formats such as the font colors, weights, or sizes; speeds or directions of post data flying, symbols or characters to be added, or the areas of the content play screen to be displayed are different between the first post data P1 and the second post data P2. The different areas on the content play screen are here as follows, as shown in FIG. 6. A screen V14 of the second user terminal 4 playing the second content data M2 includes a display V14a for displaying the first user post data in the upper half, and a display V14b for displaying the second user post data in the lower half. While FIG. 6 illustrates a case where the screen is equally divided in the up-and-down direction, the screen may be evenly divided in any direction such as the right-and-left direction or unequally. Unless there is a contradiction, various display formats may be combined.

For example, as shown in FIG. 3, the screen V11 of the second user terminal 4 displays first user post data V11a in a smaller, thinner font, and second user post data V11b in a larger, thicker font. On the other hand, as shown in FIG. 4, the screen V12 of the first user terminal 3 displays first user post data V12a in a larger, thicker font, and second user post data V12b in a smaller, thinner, font.

Figure 7:
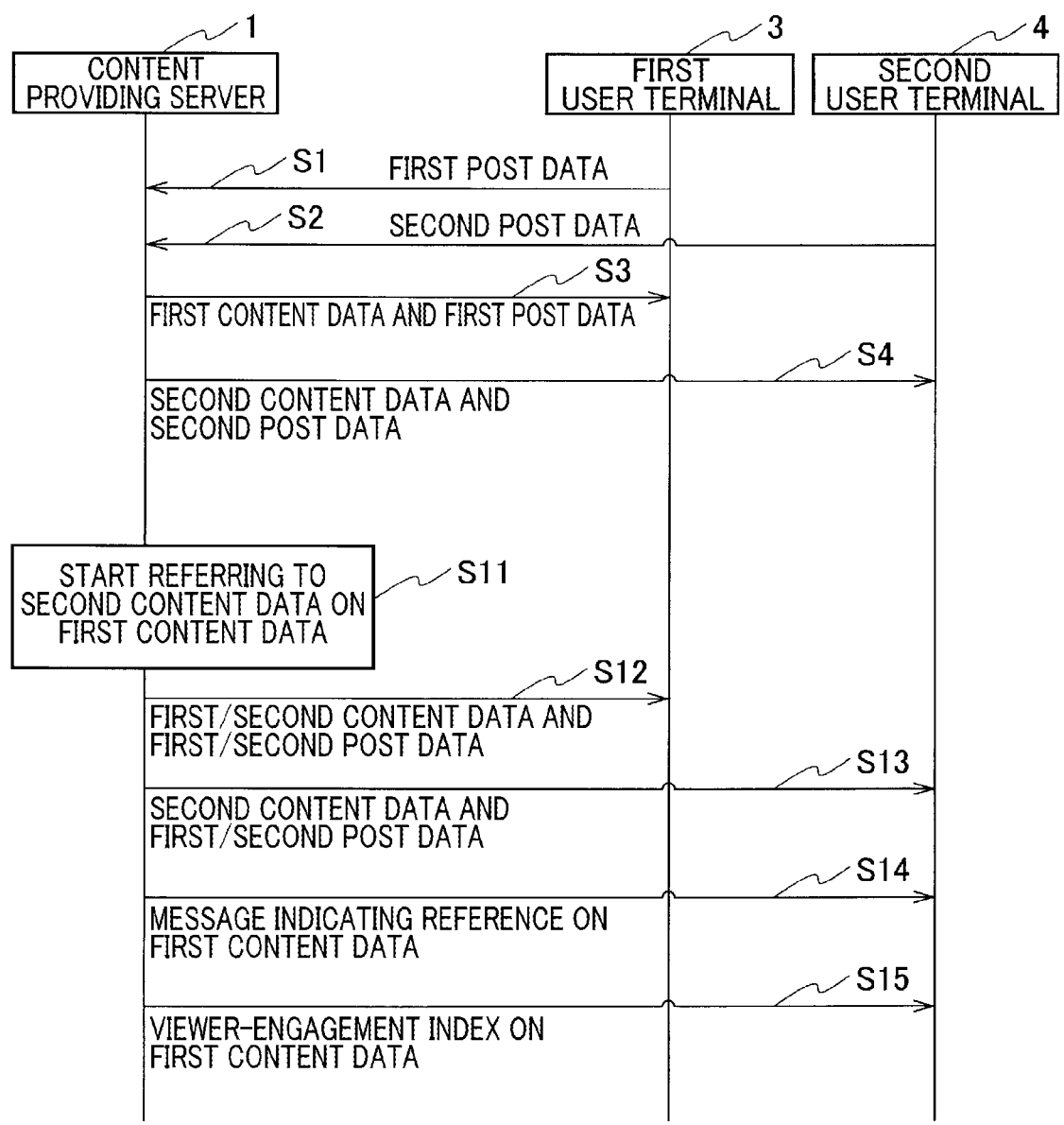
FIG. 7 is a sequence diagram illustrating a content providing method of the first embodiment of the present invention.

Referring to FIG. 7, a content providing method of the first embodiment will be described.

While no content is referred to, the content providing server 1 outputs the first content data M1 to the first user terminal 3, and the second content data M2 to the second user terminal 4. The content providing server 1 then continuously outputs the contents until a predetermined condition such as the end of the contents is satisfied.

In step S1, the content providing server 1 obtains the first post data P1 from the first user terminal 3 that has output the first content data M1. Similarly, in step S2, the content providing server 1 obtains the second post data P2 from the second user terminal 4 that has output the second content data M2. After that, in steps S3 and S4, the content providing server 1 outputs the first content data M1 and the first post data P1 to the first user terminal 3, and outputs the second content data M2 and the second post data to the second user terminal 4.

In step S11, under an instruction of the creator of the first content data M1, for example, reference to the second content data M2 on the first content data M1 starts. In this case, in step S12, the content providing server 1 outputs the first content data M1, the second content data M2, and the first post data P1 to the first user terminal 3. If outputting the post data in both directions through the reference, the content providing server 1 further outputs the second post data P2 to the first user terminal 3 in step S12. In step S13, the content providing server 1 outputs the second content data M2, the first post data P1, and the second post data P2 to the second user terminal 4.

In step S14, the content providing server 1 outputs, to the second user terminal 4, a message indicating that the second content data M2 has been referred to on the first content data M1. In step S15, the content providing server 1 outputs, to the second user terminal 4, a message notifying of the viewer-engagement index on the first content data M1.

The processing in steps S12 to S15 may be repeated intermittently until the end of reference to the second content data M2.

As described above, the content providing server 1 of the first embodiment displays, on a user terminal outputting the referred content data, information on the referring content data or post data, thereby making it possible to tell the attraction of the other content data.

The content providing server 1 of the first embodiment allows the users viewing the referred contents to refer to posts input by the users viewing the referring contents and communicate with the users. The viewer-engagement index of the referring content data, for example, is output to the user terminal outputting the referred content data to lead the viewers of the referred content data to attractive contents, for example, to allow the viewers to start viewing further similar content.

This method motivates the creators and viewers of the content data to create attractive contents that draw a larger number of viewers.

Second Embodiment

In a second embodiment, the output unit 12 of the content providing server 1 outputs the attribute information of the second content data M2 to the first user terminal 3 before referring to the second content data M2 on the first content data M1. The content providing server 1 outputs the first post data P1 to the second user terminal 4 after outputting the attribute information of the first content data M1 and before referring to the second content data M2.

Before starting the reference, the content providing server 1 outputs tag information (e.g., title, genre, or keyword) or the attribute information (e.g., the number of participants) on the content data to be referred to the user terminals on which the referring content data is viewed. This allows the viewers of the referring content data to post their thoughts on the attribute information of the referred content data. The post data of the users who have viewed such attribute information of the referred content data is displayed. This display allows the viewers of the referred content data to obtain objective thoughts or evaluations from the viewers of the other content data. Before the reference, the viewers of the referred content data refer to the post data on the referring content data. This allows the users to expect for the post data output by the viewers of the referring content data after the start of the reference to the content data.

After referring to the second content data M2, the output unit 12 of the content providing server 1 here performs adjustment to output a larger amount of the first content data M1 than before the reference. The content providing server 1 of the second embodiment outputs the post data of the viewers of the first content data M1 to the second user terminal 4 of the viewers of the second content data M2 before referring to the second content data M2 on the first content data M1. At this time, control is performed to obtain a larger number of posts per unit time than before the reference, while the second content data M2 is referred to on the first content data M1.

Figure 8:
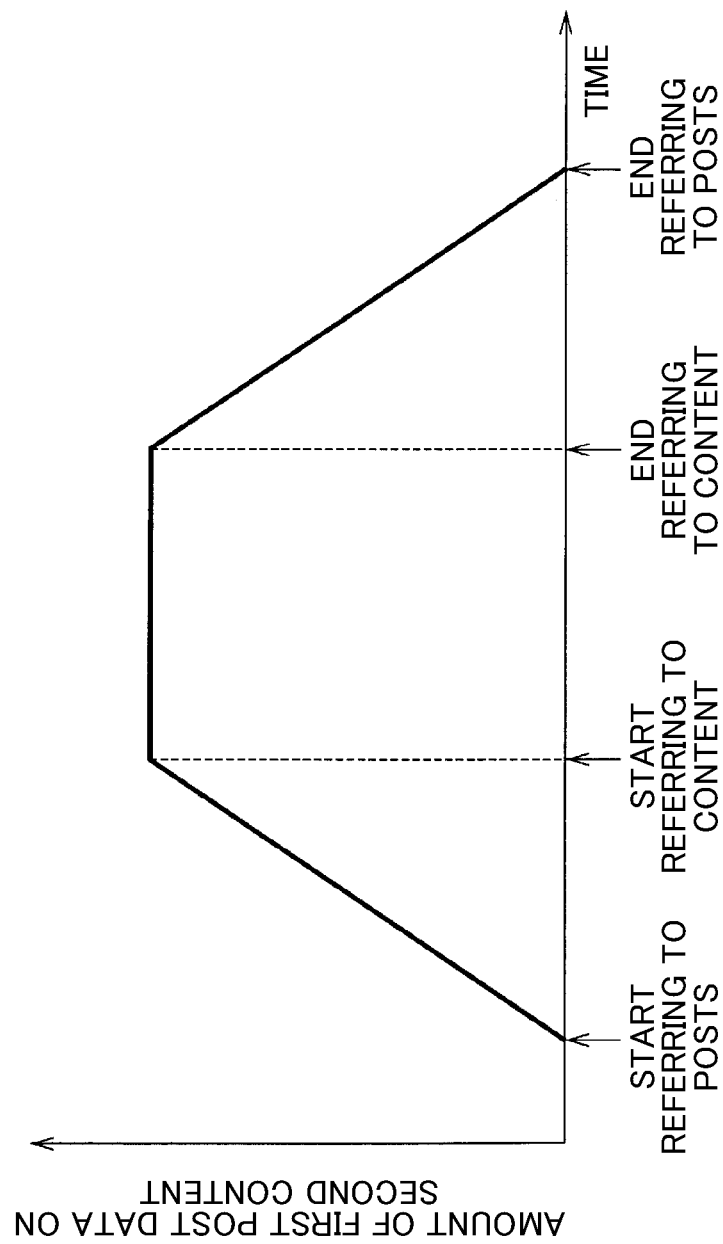
FIG. 8 illustrates the amount of first post data displayed on the second user terminal in a second embodiment of the present invention.

For example, as shown in FIG. 8, the content providing server 1 controls these phases in the order of: the start of reference to the post data; the start of reference to the content data; the end of the reference to the content data; and the end of the reference to the post data. The number of comments on the content data referring to the referred content data is largest from the start of the reference to the content to the end of the reference to the content throughout the phases. Though being constant in FIG. 8, the number of comments may change at any time according to the number of comments on the first content data M1.

The timings of the start of the reference to the post data, of the start of the reference to the content data, of the end of the reference to the content data, and of the end of the reference to the post data may be determined in accordance with any rule. For example, the timing of the start and end of the reference to the content data may be determined under an instruction of the creator of the first content data M1 (i.e., the referring content data). The timings of the start and end of the reference to the post data may also be determined under an instruction of the creator of the first content data M1. Alternatively, the timing may be controlled to start the reference to the content data after a lapse pf a predetermined time since the start of the reference to the post data, and end the reference to the post data after a lapse of a predetermined time since the end of the reference to the content data.

In the second embodiment, before referring to the second content data M2, the attribute information of the second content data M2 is output together with the first content data M1. Posts are input on the attribute information. The content providing server 1 then performs control so that the amount of the first post data P1 output to the second user terminal 4 to gradually increases, during a time period after outputting the attribute information of the second content data M2 to the first user terminal 3 on which the first content data M1 is viewed until outputting the second content data M2. Accordingly, the amount of the first post data P1 displayed on the second user terminal 4 gradually increases toward the reference to the second content data M2. This induces the expectations of the viewers of the second content data (e.g., the user of the second user terminal 4) for the reference, more specifically, the expectations for the display of the first post data P1 on the second user terminal 4.

Similarly, the content providing server 1 may control the amount of the first post data P1 output to the second user terminal 4 to gradually decrease during a predetermined time period after the end of the reference to the second content data M2 on the first content data M1. Accordingly, the first post data after referring to the second content data M2 may include comprehensive thoughts during the reference to the second content data M2. The viewers of the first content data M1 may thus obtain comprehensive evaluations on the second content data M2. Performing the control of the amount of the first post data P1 output to the second user terminal 4 to gradually decrease may emphasize the bustling during the second content data M2 has been referred to on the first content data M1 and may induce the expectations that the content is referred to by the other content data.

In the example shown in FIG. 8, examples have been described where the amount of the post data increases and decreases linearly from the start of the reference to the post data to the start of the reference to the content data, and from the end of the reference to the content data to the end of the reference to the posted data. The increase and decrease are not limited thereto. For example, the number may increase or decrease exponentially. Alternatively, the number may be controlled to gradually increase with minor fluctuations from the start of the reference to the post data to the start of the reference to the content data, and gradually decrease with minor fluctuations from the end of the reference to the content data to the end of the reference to the post data.

Figure 9:
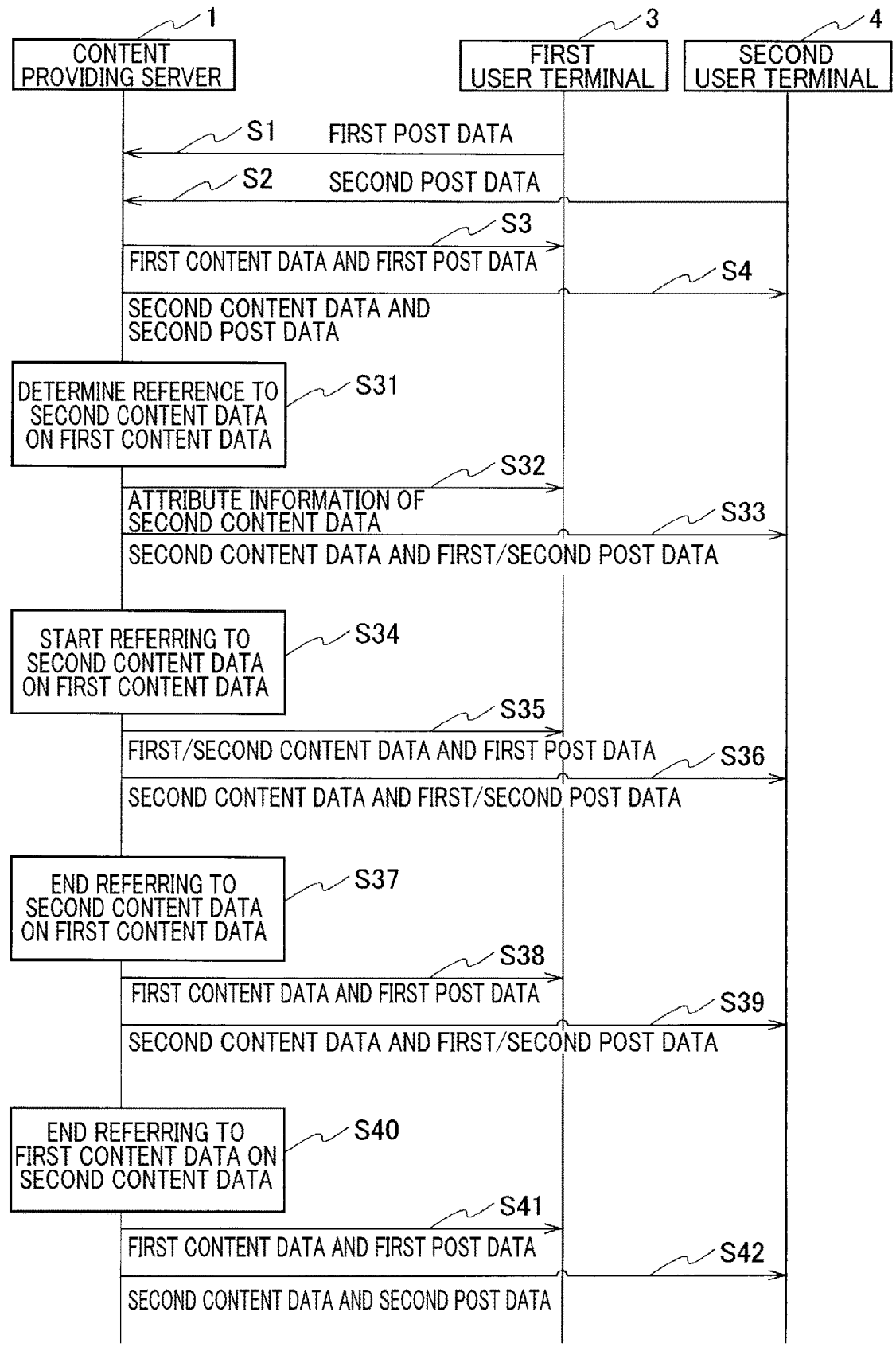
FIG. 9 is a sequence diagram illustrating a content providing method of the second embodiment of the present invention.

Referring to FIG. 9, a content providing method of the second embodiment will be described. Steps S1 to S4 in FIG. 9 are the same as steps S1 to S4 in FIG. 7, and the description thereof will thus be omitted.

In step S31, under an instruction of the creator of the first content data M1, for example, the reference to the second content data M2 on the first content data M1 is determined. In step S32, the content providing server 1 outputs the attribute information of the second content data M2 to the first user terminal 3. In step S33, the content providing server 1 outputs the second content data M2, the first post data P1, and the second post data P2 to the second user terminal 4.

In step S34, the reference to the second content data on the first content data M1 starts. In step S35, the content providing server 1 outputs the first content data M1, the second content data M2, and the first post data P1 to the first user terminal 3. In step S36, the content providing server 1 outputs the second content data M2, the first post data P1, and the second post data P2 to the second user terminal 4.

In step S37, the reference to the second content data on the first content data M1 ends. In step S38, the content providing server 1 outputs the first content data M1 and the first post data P1 to the first user terminal 3. In step S39, the content providing server 1 outputs the second content data M2, the first post data P1, and the second post data P2 to the second user terminal 4.

In step S40, the reference to the first post data P1 on the second content data M2 ends. In step S41, the content providing server 1 outputs the first content data M1 and the first post data P1 to the first user terminal 3. In step S42, the content providing server 1 outputs the second content data M2 and the second post data P2 to the second user terminal 4.

In the second embodiment, the content providing server 1 refers to the post data not only during the reference to the content data but also before and after the reference. This allows the viewers of the referred content data to obtain the thoughts, of the viewers of the referring content data, on the referred content data.

A larger amount of comments data is controlled to be output during the reference to the content data than before and after the reference to the content data, which achieves the performance of emphasizing the bustling during the reference to the content data.

Third Embodiment

In a third embodiment, the content providing server 1 determines the contents to be referred to based on the answers from the user terminals to a questionnaire. The output unit 12 of the content providing server 1 outputs, to first user terminals 3, the attribute information of the plurality of sets of content data as candidate reference content data that may possibly be referred to. The output unit 12 determines then the content data to be referred to based on the answers from the first user terminals 3.

Figure 10:
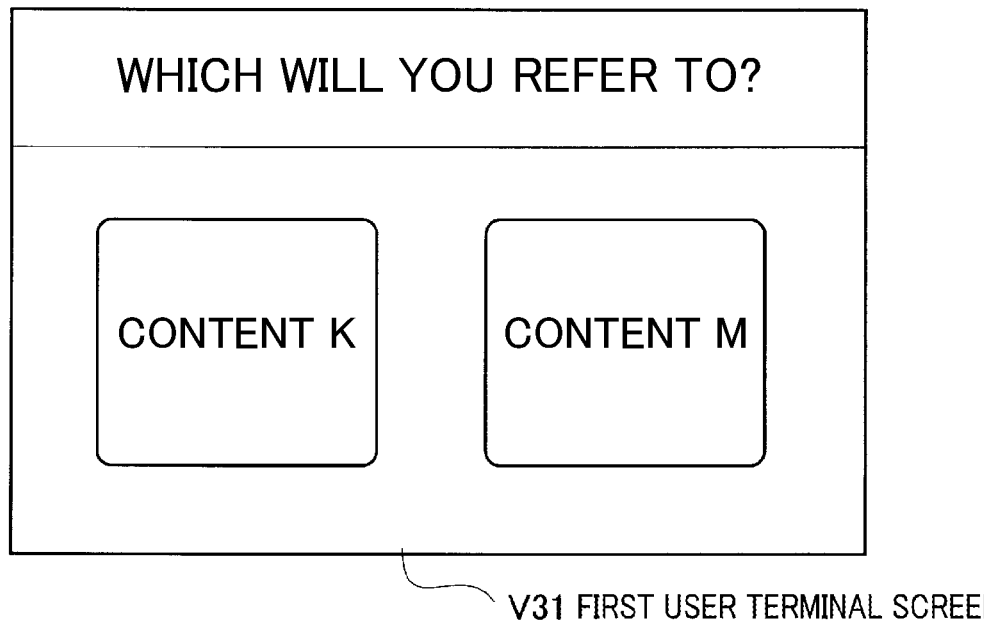
FIG. 10 illustrates an example of a screen displayed on the first user terminal in a third embodiment of the present invention.

When outputting the first content data M1 to each first user terminal 3, the content providing server 1 outputs, for example, a first user terminal screen V31 shown in FIG. 10 to the first user terminal 3. The first user terminal screen V3 shows the content names of the two contents K and M as attribute information of the candidate contents that may possibly be referred to on the first content data M1. The content providing server 1 may display, as the attribute information of the contents of the referred contents, the number of posts per unit time or the biographies of the creators of the content data, for example.

The first user terminals 3 transmit the content name selected by the user to the content providing server 1. The content providing server 1 counts the number of the content names transmitted from the first user terminals 3. As a count result, the content with the content name selected by the most user terminals is referred to on the first content data M1.

If the plurality of sets of the candidate reference content data that may possibly be referred to include the second content data M2, the output unit 12 of the content providing server 1 outputs, to the second user terminal 4, a message indicating referenceability by the first content data M1.

Figure 11:
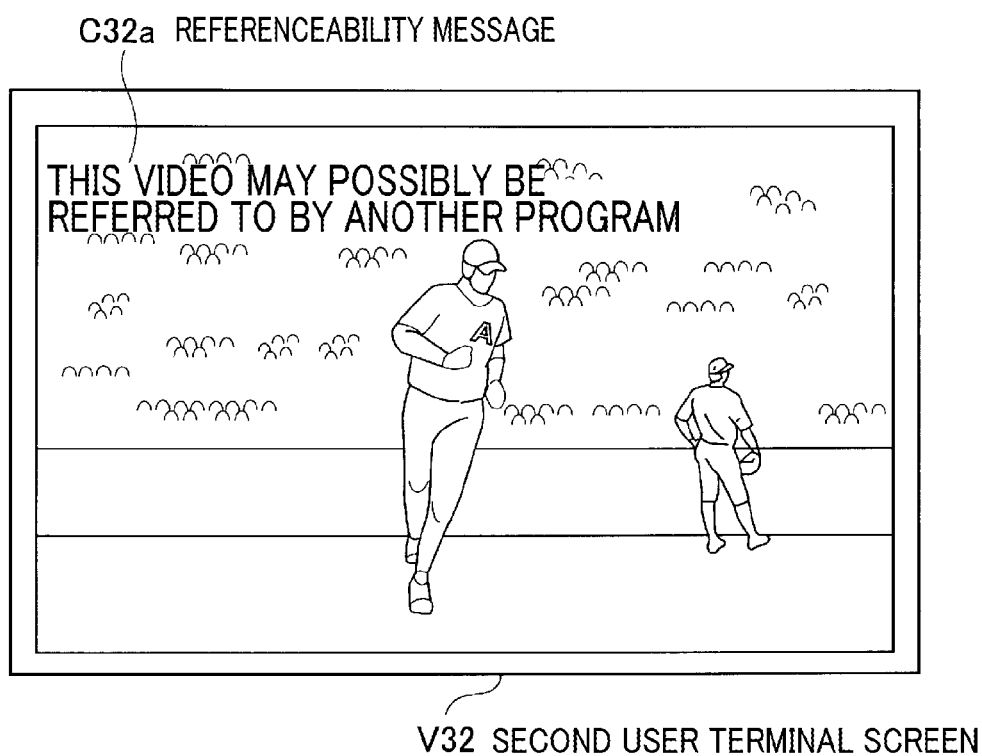
FIG. 11 illustrates an example of a screen displayed on the second user terminal in the third embodiment of the present invention.

When outputting the first user terminal screen V31 shown in FIG. 10 to the first user terminal 3, the content providing server 1 outputs a second user terminal screen V32 shown in FIG. 11 to the second user terminal 4. The second user terminal screen V32 displays, as well as the second content data M2 and the second post data P2, a referenceability message C32a. The referenceability message C32a specifies that the second content data M2 may possibly be referred to by other content data like "This video may possibly be referred to by another program." Instead of "another program," the referenceability message C32a may provide information specifying the program like "program L,".

Figure 12:
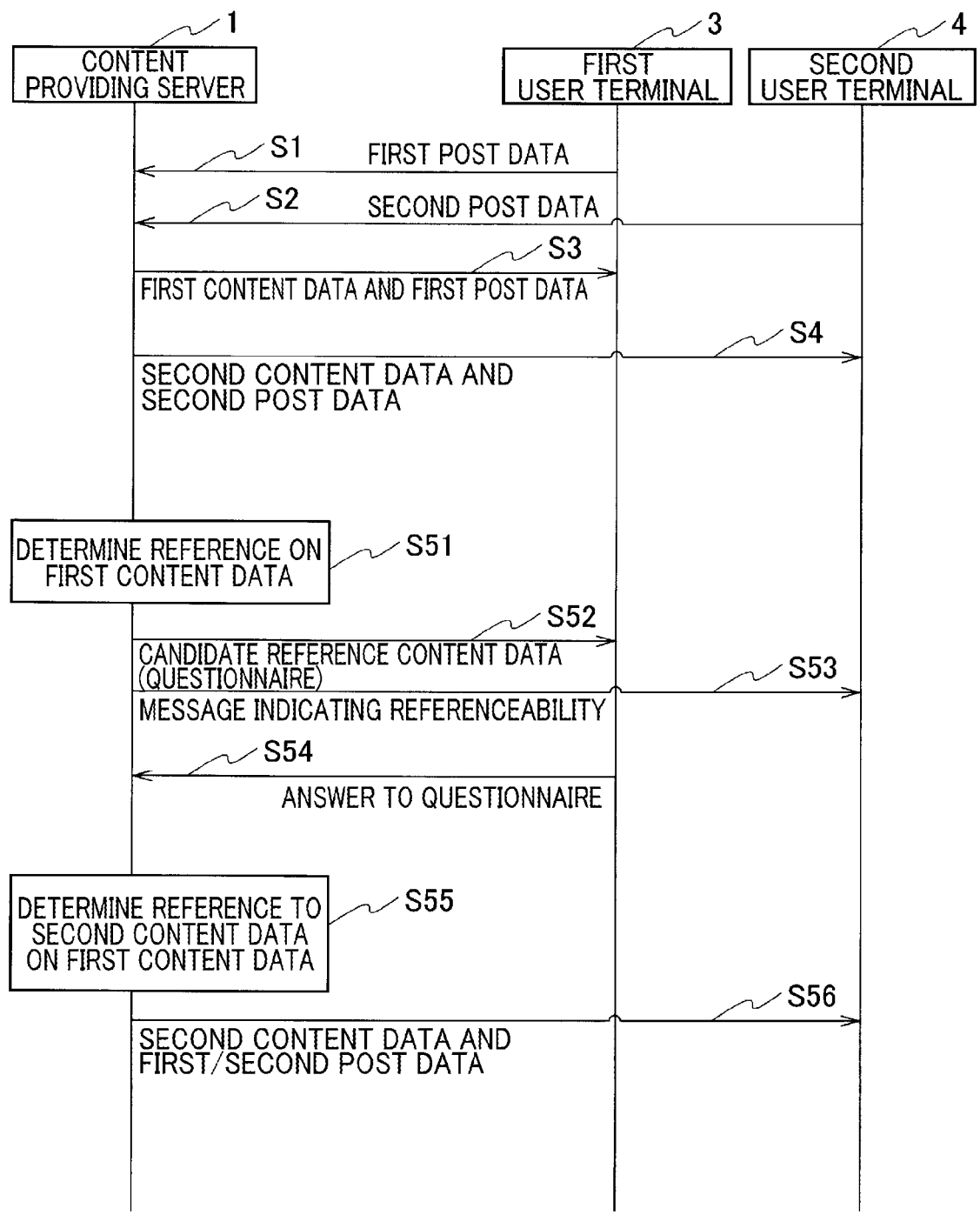
FIG. 12 is a sequence diagram illustrating a content providing method of the third embodiment of the present invention.

Referring to FIG. 12, a content providing method of the third embodiment will be described. Steps S1 to S4 in FIG. 12 are the same as steps S1 to S4 in FIG. 7, and the description thereof will thus be omitted.

In step S51, the reference to other content data on the first content data M1 is determined under an instruction of, for example, the creator of the first content data M1. In step S52, the content providing server 1 outputs sets of candidate reference content data to the first user terminal 3 as shown in FIG. 10, and waits for an answer from the first user terminal 3. If the plurality of sets of candidate reference content data displayed in step S52 include the second content data M2, the content providing server 1 outputs a message indicating the referenceability to the second user terminal 4 in step S53. In step S54, the content providing server 1 obtains, from the first user terminal 3, the result of the selection of any one of the candidates output in step S52.

Based on the result of selection in step S54, the content providing server 1 determines the content to be referred to in step S55. Here, if the reference to the second content data M2 is determined, the content providing server 1 starts referring to the second content data M2 on the first content data M1. Specifically, in step S56, the content providing server 1 outputs the second content data, the first post data P1, and the second post data P2 to the second user terminal 4.

In this manner, the determination on the content referred to by a questionnaire may motivate the creator of the referred content to add attractive attribute information. The notification that the content is selected as a candidate content that may possibly be referred to enliven a program and induces the expectations for the reference.

Other Embodiment

The present invention has been described above based on the first to third embodiments. The description and drawings constituting part of this disclosure are not to be construed as limiting the present invention. Various alternative embodiments, examples, and operating techniques will become apparent to those skilled in the art from this disclosure.

For example, the content providing server described in the embodiments of the present invention may be configured as a single hardware device as shown in FIG. 2, or may be configured as a plurality of hardware devices in accordance with the functions and the number of processes. Alternatively, the present invention may be implemented in an existing content providing system.

Needless to say, the present invention includes various embodiments that are not described herein. Accordingly, the technical scope of the present invention is defined only by the invention specifying matters according to the scope of claims reasonable from the above description.

DESCRIPTION OF REFERENCE CHARACTERS

1 Content Providing Server
2 Content Providing System
3 First User Terminal
4 Second User Terminal
9 Communication Network
10 Processor
11 Obtainer
12 Output Unit
20 Storage
M1 First Content Data
M2 Second Content Data
P1 First Post Data
P2 Second Post Data

The invention claimed is:

1. A content providing server, comprising:
a processor; and
storage including at least one content providing program that, when executed by the processor, causes the content providing server to perform actions comprising:
obtaining first post data from a first user terminal on which first content data is being viewed, and second post data from a second user terminal on which second content data is being viewed;
outputting the first content data and the first post data to the first user terminal, and the second content data and the second post data to the second user terminal, and outputting, if referring to and outputting the second content data on the first content data by the first user terminal, the second content data to the first user terminal, and the first post data to the second user terminal; and
further outputting the second post data to the first user terminal.

2. The content providing server of claim 1, wherein the actions further comprise
outputting a viewer-engagement index of the first content data to the second user terminal.

3. The content providing server of claim 1, wherein the actions further comprise
thinning the first post data and outputting the resulting data to the second user terminal.

4. The content providing server of claim 1, wherein
the second content data is video data, and
wherein the actions further comprise outputting the first post data and the second post data with distinction on a screen of the second user terminal playing the second content data.

5. A content providing server, comprising:
a processor; and
storage including at least one content providing program that, when executed by the processor, causes the content providing server to perform actions comprising:
obtaining first post data from a first user terminal on which first content data is being viewed, and second post data from a second user terminal on which second content data is being viewed;
outputting the first content data and the first post data to the first user terminal, and the second content data and the second post data to the second user terminal, and outputting, if referring to and outputting the second content data on the first content data by the first user terminal, the second content data to the first user terminal, and the first post data to the second user terminal; and
outputting attribute information of the second content data to the first user terminal before referring to the second content data on the first content data, and further outputting the first post data to the second user terminal after outputting attribute information of the first content data and before referring to the second content data.

6. The content providing server of claim 5, wherein
after referring to the second content data, performing adjustment to output, to the second user terminal, a larger amount of the first content data than before the reference.

7. A content providing server, comprising:
a processor, and
storage including at least one content providing program that, when executed by the processor, causes the content providing server to perform actions comprising:
obtaining first post data from a first user terminal on which first content data is being viewed, and second post data from a second user terminal on which second content data is being viewed;
outputting the first content data and the first post data to the first user terminal, and the second content data and the second post data to the second user terminal, and outputting, if referring to and outputting the second content data on the first content data by the first user terminal, the second content data to the first user terminal, and the first post data to the second user terminal; and
outputting, to the first user terminal, attribute information of a plurality of sets of content data, and further determining a set of content data to be referred to based on an answer from the first user terminal.

8. The content providing server of claim 7, wherein the actions further comprise
outputting to the second user terminal, a message indicating referenceability by the first content data, at the time of outputting the attribute information of the plurality of sets of content data to the first user terminal, if the plurality of sets of candidate reference content data that may possibly be referred to include the second content data.

9. A content providing system comprising:
a first user terminal; a second user terminal; and a content providing server connected to the first user terminal and the second user terminal,
the content providing server including:
a processor; and
storage including at least one content providing program that, when executed by the processor, causes the content providing server to perform actions comprising:
obtaining first post data from a first user terminal on which first content data is being viewed, and second post data from the second user terminal on which second content data is being viewed; and
outputting the first content data and the first post data to the first user terminal, and the second content data and the second post data to the second user terminal, and outputting, if referring to and outputting the second content data on the first content data by the first user terminal, the second content data and the second post data to the first user terminal, and the first post data to the second user terminal, the first user terminal being configured to output the first content data and the first post data, and to output the second content data and the second post data if referring to the second content data on the first content data, the second user terminal being configured to output the second content data and the second post data, and to output the first post data if referring to the second content data on the first content data.

10. A content providing system, comprising:

a first user terminal; a second user terminal; and a content providing server connected to the first user terminal and the second user terminal, the content providing server including:

a processor; and storage including at least one content providing program that, when executed by the processor, causes the content providing server to perform actions comprising:

obtaining first post data from a first user terminal on which first content data is being viewed, and second post data from a second user terminal on which second content data is being viewed;

outputting the first content data and the first post data to the first user terminal, and the second content data and the second post data to the second user terminal, and outputting, if referring to and outputting the second content data on the first content data by the first user terminal, the second content data to the first user terminal, and the first post data to the second user terminal; and outputting attribute information of the second content data to the first user terminal before referring to the second content data on the first content data, and outputting the first post data to the second user terminal after outputting attribute information of the first content data and before referring to the second content data, the first user terminal being configured to output the first content data and the first post data, and to output the second content data and the second post data referring to the second content data on the first content data, and to output attribute information of the second content data to the first user terminal before referring to the second content data on the first content data, the second user terminal being configured to output the second content data and the second post data, and to output the first post data after outputting the attribute information of the first content data to the first user terminal and before referring to the second content data.

11. A content providing system, comprising:

a first user terminal; a second user terminal; and a content providing server connected to the first user terminal and the second user terminal, the content providing server including:

a processor; and storage including at least one content providing program that, when executed by the processor, causes the content providing server to perform actions comprising:

obtaining first post data from a first user terminal on which first content data is being viewed, and second post data from a second user terminal on which second content data is being viewed;

outputting the first content data and the first post data to the first user terminal, and the second content data and the second post data to the second user terminal, and outputting, if referring to and outputting the second content data on the first content data by the first user terminal, the second content data to the first user terminal, and the first post data to the second user terminal; and outputting, to the first user terminal, attribute information of a plurality of sets of content data, and determining a set of content data to be referred to based on an answer from the first user terminal, the first user terminal being configured to output the first content data and the first post data, to output the second content data, if referring to the second content data on the first content data, and to output attribute information of the second content data before referring to the second content data on the first content data, the second user terminal being configured to output the second content data and the second post data, and to output the first post data after outputting attribute information of the first content data to the first user terminal and before referring to the second content data.

12. A non-transitory computer readable medium storing a user program used by a second user terminal configured to be connected to a content providing server, the program causing the second user terminal to perform actions comprising:

receiving, from the content providing server, first post data input by a user viewing first content data through a first user terminal, second content data, and second post data input by a user viewing the second content data through the second user terminal, and outputting the received data, wherein attribute information of the second content data is output from the content server to the first user terminal before the second content data is referred to on the first content data by the first user terminal, and wherein the actions further comprise: receiving the first post data from the content providing server after attribute information of the first content data is output to the first user terminal on which the first content data is viewed and before the second content data is referred to on the first content data by the first user terminal.

13. A non-transitory computer readable medium storing a user program used by a user terminal configured to be connected to a content providing server, the program causing the user terminal to perform actions comprising:

receiving, from the content providing server, first post data input by a user viewing first content data, the first content data, and second content data and outputting the received data;

referring to the second content data on the first content data; and outputting attribute information of a plurality of sets of content data, and referring to a set of content data determined based on an answer from the user terminal.

14. A non-transitory computer readable medium storing a user program used by a second user terminal configured to be connected to a content providing server, the program causing the second user terminal to perform actions comprising:

receiving, from the content providing server, first post data input by a user viewing first content data through a first user terminal, second content data, and second post data input by a user viewing the second content data through the second user terminal, and outputting the received data, wherein attribute information of a plurality of sets of content data is output from the content server to the first user terminal, and a set of content data to be referred to is determined by the content providing server based on an answer from the first user terminal on which the first content data is viewed, and wherein the actions further comprise: outputting a message indicating referenceability by the first content data, if the plurality of sets of content data include the second content data.

* * * * *